US010244417B2

(12) United States Patent
McCarthy et al.

(10) Patent No.: US 10,244,417 B2
(45) Date of Patent: *Mar. 26, 2019

(54) NETWORK DIAGNOSTIC SYSTEM FOR ANALYZING PERFORMANCE OF A RADIO NETWORK DURING FUNCTIONAL OVER-THE-AIR OPERATION

(71) Applicant: Locus Location Systems, LLC, West Melbourne, FL (US)

(72) Inventors: John McCarthy, Palm Bay, FL (US); Robert Mitchell, Orlando, FL (US); Joseph Rey, Miami, FL (US)

(73) Assignee: Locus Location Systems, LLC, West Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,358

(22) Filed: Jul. 7, 2017

(65) Prior Publication Data
US 2017/0311190 A1  Oct. 26, 2017

Related U.S. Application Data

(62) Division of application No. 15/221,268, filed on Jul. 27, 2016, now Pat. No. 9,743,302, which is a division
(Continued)

(51) Int. Cl.
*H04B 17/27* (2015.01)
*H04W 24/08* (2009.01)
(Continued)

(52) U.S. Cl.
CPC ............ *H04W 24/08* (2013.01); *H04B 17/17* (2015.01); *H04B 17/18* (2015.01); *H04B 17/309* (2015.01);
(Continued)

(58) Field of Classification Search
CPC ..... H04W 64/00; H04W 4/025; H04W 24/10; H04W 12/12; H04W 24/08; H04W 4/023;
(Continued)

(56) References Cited

U.S. PATENT DOCUMENTS 4,554,410 A  11/1985  Furumoto
5,557,606 A   9/1996  Moon et al.
(Continued)

OTHER PUBLICATIONS

Extended European Search Report and European Search Opinion of the European Patent Office dated Oct. 21, 2014, for International Application No. PCT/US2012/037037.
(Continued)

*Primary Examiner* — Daniel Lai
(74) *Attorney, Agent, or Firm* — Gregory L Mayback

(57) ABSTRACT

An apparatus determining network health comprising base stations in bidirectional communication with radios, each having an identifier and transmitting a signal including the identifier. First and second health determining devices each receive the signal during normal over-the-air operation of radio and determine if the radio is authorized and, if so, determine the identifier, time-separated signal waveforms that are compared, operating characteristics from the compared waveforms, and a current location of the radio. Each of the devices determine health of the radio based on packet sniffing, a frequency deviation, or a range of deviations by analyzing the operating characteristics. After analysis results sent to the master controller from the devices indicate that the authorized radio is healthy, the master controller determines from the analysis results that a geographically unhealthy location of the network exists within the geographic area from which the authorized healthy radio transmitted the signal.

24 Claims, 2 Drawing Sheets

Related U.S. Application Data of application No. 14/316,920, filed on Jun. 27, 2014, now Pat. No. 9,432,866, which is a division of application No. 13/106,833, filed on May 12, 2011, now Pat. No. 8,825,042.

(51) Int. Cl.

| | | |
|---|---|---|
| *H04B 17/309* | (2015.01) | |
| *H04B 17/318* | (2015.01) | |
| *H04B 17/336* | (2015.01) | |
| *H04W 64/00* | (2009.01) | |
| *H04B 17/17* | (2015.01) | |
| *H04B 17/18* | (2015.01) | |
| *H04B 17/23* | (2015.01) | |

(52) U.S. Cl.
CPC ......... *H04B 17/318* (2015.01); *H04B 17/336* (2015.01); *H04W 64/00* (2013.01); *H04B 17/23* (2015.01); *H04B 17/27* (2015.01)

(58) Field of Classification Search
CPC ....... H04W 4/02; H04W 84/12; H04W 88/08; H04W 12/00; H04W 12/08; H04W 72/082; H04W 28/0236; H04W 28/04; H04W 36/20; H04W 4/029; H04W 84/18; H04W 24/02; H04W 40/246; H04W 4/04; H04W 4/043; H04W 4/30; H04W 12/06; H04W 16/18; H04W 24/00; H04W 24/04; H04B 17/309; H04B 17/336; H04B 17/318; H04B 17/27; H04B 17/23; H04B 17/345; H04B 17/0085; H04B 17/17; H04B 17/18; H04L 43/045; H04L 43/08; H04L 63/1416; H04L 63/20; H04L 65/80; H04L 45/28; H04L 63/1425; H04L 43/04; H04L 43/062; H04L 43/0829; H04L 43/065; H04L 43/0876; H04L 63/1408; H04L 67/22; H04L 41/046; H04L 41/0631; H04L 41/0645; H04L 41/069; H04L 41/0816; H04L 41/0873; H04L 41/14; H04L 41/5096; H04L 43/00; H04L 43/02; H04L 43/06; H04L 43/10; H04L 43/12; H04L 43/50; H04L 47/11

See application file for complete search history.

(56) References Cited

U.S. PATENT DOCUMENTS

| | | |
|---|---|---|
| 5,832,379 A | 11/1998 | Mallinckrodt |
| 5,973,643 A | 10/1999 | Hawkes |
| 5,987,306 A | 11/1999 | Nilsen et al. |
| 6,157,825 A | 12/2000 | Frederick |
| 6,181,925 B1 | 1/2001 | Kaminsky et al. |
| 6,308,065 B1 | 10/2001 | Molinari et al. |
| 6,671,291 B1 | 12/2003 | Soliman |
| 6,745,011 B1 | 6/2004 | Hendrickson et al. |
| 6,873,601 B1 | 3/2005 | Chow |
| 6,965,769 B2 | 11/2005 | Bims et al. |
| 7,346,346 B2 | 3/2008 | Lipsit |
| 7,881,206 B2 | 2/2011 | St. Pierre et al. |
| 7,913,182 B2 | 3/2011 | Bear et al. |
| 8,000,700 B2 | 8/2011 | Choi et al. |
| 2002/0009992 A1 | 1/2002 | Jensen |
| 2002/0072359 A1 | 6/2002 | Moles et al. |
| 2003/0061340 A1 | 3/2003 | Sun et al. |
| 2004/0032836 A1 | 2/2004 | Grilli et al. |
| 2004/0142699 A1 | 7/2004 | Jollota et al. |
| 2004/0203489 A1 | 10/2004 | Comerford et al. |
| 2006/0003776 A1 | 1/2006 | Natori et al. |
| 2006/0030270 A1 | 2/2006 | Cheng |
| 2006/0141998 A1 | 6/2006 | Kennedy, Jr. et al. |
| 2006/0205398 A1 | 9/2006 | Seckendorf et al. |
| 2007/0178843 A1 | 8/2007 | Singh et al. |
| 2008/0095131 A1 | 4/2008 | Aljadeff et al. |
| 2008/0113623 A1 | 5/2008 | Gormley |
| 2008/0146161 A1 | 6/2008 | Bugenhagen |
| 2008/0201109 A1 | 8/2008 | Zill et al. |
| 2009/0052330 A1 | 2/2009 | Matsunaga et al. |
| 2009/0082009 A1 | 3/2009 | Nagy et al. |
| 2009/0098867 A1 | 4/2009 | Varanda |
| 2009/0098868 A1 | 4/2009 | Cheng |
| 2009/0310501 A1 | 12/2009 | Catovic et al. |
| 2010/0020717 A1 | 1/2010 | McGregor et al. |
| 2010/0197299 A1 | 8/2010 | Huber et al. |
| 2010/0254267 A1 | 10/2010 | Blackwell |
| 2010/0259448 A1 | 10/2010 | Qahwash et al. |
| 2011/0039520 A1 | 2/2011 | Maida et al. |
| 2011/0090807 A1 | 4/2011 | Caudill et al. |

OTHER PUBLICATIONS

International Search Report dated Aug. 3, 2012, for International Application No. PCT/US2012/037037.

NETWORK DIAGNOSTIC SYSTEM FOR ANALYZING PERFORMANCE OF A RADIO NETWORK DURING FUNCTIONAL OVER-THE-AIR OPERATION

CROSS-REFERENCE TO RELATED APPLICATION

This application:
is a divisional of co-pending U.S. patent application Ser. No. 15/221,268, filed on Jul. 27, 2016, which:
 is a divisional of U.S. patent application Ser. No. 14/316,920, filed on Jun. 27, 2014, now U.S. Pat. No. 9,432,866, issued on Aug. 30, 2016, which:
  is a divisional of U.S. patent application Ser. No. 13/106,833 filed on May 12, 2011, now U.S. Pat. No. 8,825,042, issued on Sep. 2, 2014,
the entire disclosures of which are hereby incorporated herein by reference in their entirety.

STATEMENT REGARDING FEDERALLY SPONSORED RESEARCH OR DEVELOPMENT

Not Applicable

BACKGROUND OF THE INVENTION

The ability of a communications network comprising a plurality of transceivers (referred to as radios in some networks) to operate according to its specifications is crucial to proper communications between the network radios. Sometimes a network user or operator does not realize the network is not operating according to its specifications until it fails completely. Network failure may be due to the improper operation of one or more radios within the system, one or more network base stations, or interference encountered by network signals. The faulty radio or base station must be taken out of service, the cause of the failure diagnosed and the radio or base station repaired. The present invention overcomes this limitation by advising the network users when a network specification parameter is not met, albeit network performance is degraded and the network has not failed completely.

SUMMARY OF THE INVENTION

The systems, apparatuses, and methods described provide a network diagnostic system that overcomes the hereinaforementioned disadvantages of the heretofore-known devices and methods of this general type.

With the foregoing and other objects in view, there is provided, a communications network health-determining apparatus, the network comprising a plurality of network base station transceivers distributed over a geographic area and in bidirectional communication with radios operating in the network, each radio having a respective radio identifier and transmitting a signal including the respective radio identifier, the apparatus comprising health determining devices and a master controller. The health determining devices configured to receive the signal during normal over-the-air operation of one of the radios and configured to determine if the signal received by the one radio was transmitted from an authorized one of the radios, and, when a health determining device determines that the signal is from an authorized radio the health determining device measures signal parameters of the signal, the health determining device determines operating characteristics of the authorized radio from the measured signal parameters, and the health determining device determines a current location of the authorized radio within the geographic area. The master controller communicatively coupled to the health determining devices. The first of the health determining devices configured to analyze the operating characteristics of the authorized radio and determining if the authorized radio is healthy by at least one of packet sniffing a received signal from the authorized radio and determining if the authorized radio is compliant with a packet/signal specification structure, determining a frequency deviation of the signal from the authorized radio, and determining a range of frequency deviations of the signal from the authorized radio over time, and configured to send a first analysis result of the authorized radio to the master controller. The second of the health determining devices configured to analyze the operating characteristics of the authorized radio and determining if the authorized radio is healthy by at least one of packet sniffing a received signal from the authorized radio and determining if the authorized radio is compliant with a packet/signal specification structure, determining a frequency deviation of the signal from the authorized radio, and determining a range of frequency deviations of the signal from the authorized radio over time, and configured to send a second analysis result of the authorized radio to the master controller. After both the first and second analysis results sent to the master controller indicate that the authorized radio is healthy, the master controller determines from the first and second analysis results that a geographically unhealthy location of the network exists within the geographic area at the current location of the authorized healthy radio.

With the objects in view, there is also provided a communications network health-determining apparatus, the network comprising a plurality of network base station transceivers distributed over a geographic area and in bidirectional communication with radios operating in the network, each radio having a respective radio identifier and transmitting a signal including the respective radio identifier, the apparatus comprising health determining devices and a master controller. The health determining devices configured to receive the signal during normal over-the-air operation of one of the radios, configured to determine if the signal received by the one radio was transmitted from an authorized one of the radios, and, when a health determining device determines that the signal is from an authorized radio the health determining device determines a current location of the authorized radio within the geographic area and the health determining device forwards the signal of the authorized radio along with the radio identifier and the current location of the authorized radio to the master controller. The master controller communicatively coupled to the health determining devices, configured to receive the signal, the radio identifier, and the current location from the health determining devices, configured to measure signal parameters of the signals received, configured to determine operating characteristics of each of the authorized radios from the respective measured signal parameters, configured to analyze the operating characteristics of each of the authorized radios and determining if each of the authorized radios is healthy by at least one of packet sniffing a received signal from the authorized radio and determining if the authorized radio is compliant with a packet/signal specification structure determining a frequency deviation of the signal from the authorized radio, and determining a range of frequency deviations of the signal from the authorized radio over time, configured to create an analysis result of each of the authorized radios. After at least two analysis results sent to the master controller from two different health determining devices indicate that one of the authorized radios is healthy, the master controller determines that a geographically unhealthy location of the network exists within the geographic area at the associated current location of the one authorized radio within the geographic area.

With the objects in view, there is also provided a communications network health-determining apparatus, the network comprising a plurality of network base station transceivers distributed over a geographic area and in bidirectional communication with radios operating in the network, each radio having a respective radio identifier and transmitting a signal including the respective radio identifier, the apparatus comprising health determining devices and a master controller. The health determining devices configured to receive the signal during normal over-the-air operation of one of the radios. The master controller communicatively coupled to the health determining devices either:

the health determining devices:
    configured to determine if the signal was transmitted from an authorized one of the radios; and
    when a health determining device determines that the signal is from an authorized radio:
        the health determining device measures signal parameters of the signal;
        the health determining device determines operating characteristics of the authorized radio from the measured signal parameters; and
        the health determining device determines a current location of the authorized radio within the geographic area;
a first of the health determining devices:
    configured to analyze the operating characteristics of the authorized radio and determining if the authorized radio is healthy by at least one of:
        packet sniffing a received signal from the authorized radio and determining if the authorized radio is compliant with a packet/signal specification structure;
        determining a frequency deviation of the signal from the authorized radio; and
        determining a range of frequency deviations of the signal from the authorized radio over time; and
    configured to send a first analysis result of the authorized radio to the master controller; and
a second of the health determining devices:
    configured to analyze the operating characteristics of the authorized radio and determining if the authorized radio is healthy by at least one of:
        packet sniffing a received signal from the authorized radio and determining if the authorized radio is compliant with a packet/signal specification structure;
        determining a frequency deviation of the signal from the authorized radio; and
        determining a range of frequency deviations of the signal from the authorized radio over time; and
    configured to send a second analysis result of the authorized radio to the master controller; and
after both the first and second analysis results sent to the master controller indicate that the authorized radio is healthy, the master controller determines from the first and second analysis results that a geographically unhealthy location of the network exists within the geographic area at the current location of the authorized healthy radio;

or
the health determining devices:
    configured to determine if the signal was transmitted from an authorized one of the radios; and
    when a health determining device determines that the signal is from an authorized radio:
        the health determining device determines a current location of the authorized radio within the geographic area; and
        the health determining device forwards the signal of the authorized radio along with the radio identifier and the current location of the authorized radio to the master controller; and
the master controller:
    configured to receive the signal, the radio identifier, and the current location from the health determining devices;
    configured to measure signal parameters of the signals received;
    configured to determine operating characteristics of each of the authorized radios from the respective measured signal parameters;
    configured to analyze the operating characteristics of each of the authorized radios and determining if each of the authorized radios is healthy by at least one of:
        packet sniffing a received signal from the authorized radio and determining if the authorized radio is compliant with a packet/signal specification structure;
        determining a frequency deviation of the signal from the authorized radio; and
        determining a range of frequency deviations of the signal from the authorized radio over time; and
    configured to create an analysis result of each of the authorized radios.

After at least two analysis results sent to the master controller from two different health determining devices indicate that one of the authorized radios is healthy, the master controller determines that a geographically unhealthy location of the network exists within the geographic area at the associated current location of the one authorized radio within the geographic area.

In accordance with another feature, the authorized radio in bidirectional communication with at least one of the first and second health determining devices receives the determination from at least one of the first and second health determining devices that the authorized radio is healthy.

In accordance with a further feature, the authorized radio in bidirectional communication with at least one of the first and second health determining devices receives the determination from at least one of the first and second health determining devices that the authorized radio is not healthy.

In accordance with an added feature, the authorized radio in bidirectional communication receives a bidirectional communication indicating the parameter determined to be unhealthy.

In accordance with an additional feature, the authorized radio in bidirectional communication receives the unhealthy parameter determination and a correction message to cure the unhealthy parameter.

In accordance with yet another feature, the authorized radio in bidirectional communication receives a bidirectional communication indicating at least one of the authorized radio is not compliant with a packet/signal specification structure, the frequency of the signal from the authorized radio has deviated, and the range of frequency of the signal from the authorized radio over time has deviated.

In accordance with yet a further feature, the authorized radio in bidirectional communication receives a correction message to cure the parameter determined to be unhealthy.

In accordance with yet an added feature, the authorized radio in bidirectional communication with at least one of the health determining devices and the master controller receives the determination from at least one of the health determining devices and the master controller that the authorized radio is healthy.

In accordance with yet an additional feature, the authorized radio in bidirectional communication with at least one of the health determining devices and the master controller receives the determination from at least one of the health determining devices and the master controller that the authorized radio is not healthy.

In accordance with again another feature, the authorized radio in bidirectional communication receives a bidirectional communication indicating at least one of the authorized radio is not compliant with a packet/signal specification structure, the frequency of the signal from the authorized radio has deviated, and the range of frequency of the signal from the authorized radio over time has deviated.

In accordance with again a further feature, the authorized radio in bidirectional communication receives a correction message to cure the parameter determined to be unhealthy.

In accordance with again an added feature, the authorized radio in bidirectional communication with at least one of the first and second health determining devices receives the determination from at least one of the health determining devices and the master controller that the authorized radio is healthy.

In accordance with again an additional feature, the authorized radio in bidirectional communication with at least one of the first and second health determining devices receives the determination from at least one of the health determining devices and the master controller that the authorized radio is not healthy.

In accordance with still another feature, the authorized radio in bidirectional communication receives a bidirectional communication indicating the parameter determined to be unhealthy.

In accordance with a concomitant feature, the authorized radio in bidirectional communication receives the unhealthy parameter determination and a correction message to cure the unhealthy parameter.

Although the systems, apparatuses, and methods are illustrated and described herein as embodied in a network diagnostic system, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The present invention can be more easily understood and the advantages and uses thereof more readily apparent when the following detailed description of the present invention is read in conjunction with the figures wherein.

In accordance with common practice, the various described features are not drawn to scale, but are drawn to emphasize specific features relevant to the invention. Like reference characters denote like elements throughout the figures and text.

DETAILED DESCRIPTION OF THE INVENTION

Figure 1:
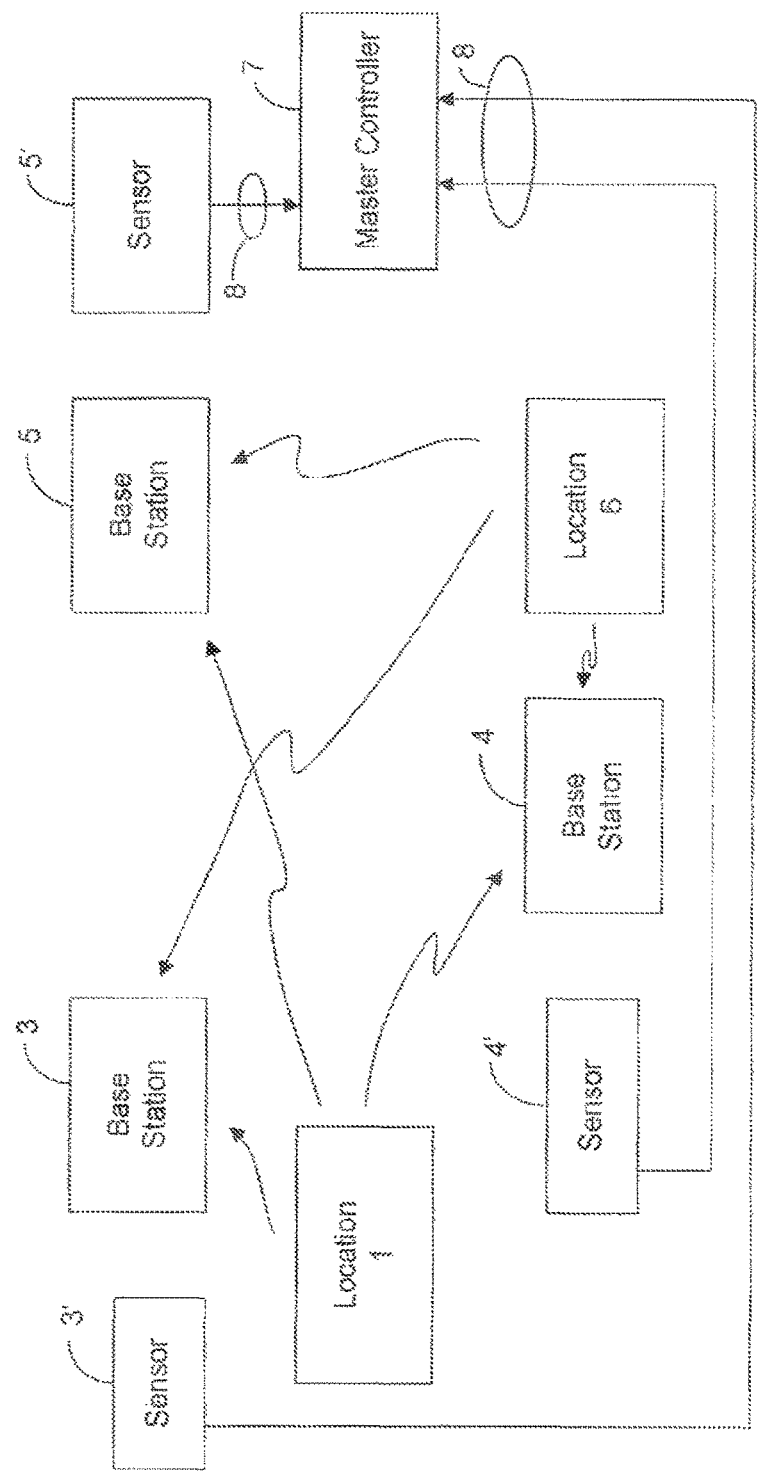
FIG. 1 illustrates a network illustrating one exemplary embodiment of a network diagnostic system.

Before describing in detail a diagnostic system for analyzing performance of a radio network during over-the-air operation, according to the present invention, it should be observed that the present invention resides in a novel and non-obvious combination of structural elements and method steps. Accordingly, these elements have been represented by conventional elements and steps in the drawings and specification. The elements and process steps conventionally known in the art are described in lesser detail, and elements and steps pertinent to understanding the invention are described in greater detail. The following preferred embodiments are an application of the present invention and are not intended to define limits of the structure or use of the invention, but only to provide exemplary constructions. Many variations can be made to the described diagnostic system within the scope of the presented claims.

As used herein the term "radio" refers to any transceiver (or a transmitter or a receiver) transmitting or transmitting and receiving RF signals. Mobile and portable transceivers used in public safety trunked networks are commonly referred to as radios. As used herein, the term "radio network" refers to a communications network comprising such radios. The radios may comprise mobile, portable or stationary transceivers operating in a network environment, with each radio transmitting a radio frequency signal for receiving by another radio within the network via a network base station.

The present invention, commercially referred to as a DiagnostX System, determines the "health" of a radio network by measuring multiple radio operating parameters at a plurality of locations in a network coverage area. The network "health" is determined from these measured parameters. The "health" may be deemed good if at most locations within the network the measured parameters are within a specified range. The "health" may be deemed poor if the measured parameters are beyond a desired range for many or most locations within the network or if a receiver or transmitter is outside a boundary.

Several network-related components may degrade network performance, e.g., base station equipment failures, antenna cable breakdown. Also, a radio exhibiting poor "health" may cause degradation of the network. In this case the network is degraded by the inability of a poor "health" radio to communicate with other network radios. Thus, according to the present invention, only known good radios are used to determine network health.

Beyond the use of good radios to determine network health, radios that are authorized and/or unauthorized to use the network can also be used to determine network health. A radio that is not authorized to use the network (for example, a clone of an authorized radio) degrades the capacity of the network and, at least tangentially, the health of the network.

By first identifying signal parameters that determine radio health, a DNA (DiagnostX Network Anomaly) can be used to later identify unauthorized radios on the network. For example, by determining that two or more radio transmissions using the same radio identification did not originate from the same radio (because the determined signal parameters do not match) is typically evidence of a DNA, i.e., an unauthorized radio on the network. These DNA radios are not used to determine other factors of network health. Thus, only non-DNA signals are used to determine network health.

The network may include, but is not limited to, a WiFi network, a trunked radio network, a cellular telephone network, a paging network, a WiMax network, an 802.11x network and a Zigbee network. The teachings of the invention can be applied to radios operating in digital and analog networks (where the analog networks include such devices as conventional two-way radios and AM or FM transmitters).

By determining the "health" of the network, the system can identify incipient and real-time network problems and prompt the initiation of necessary repairs. This reduces network downtime and improves network "health" after successful completion of the repair. A "healthy" network ensures improved performance for radios operating in the network. Further, when radios operating in the network are located using the signals they transmit, a "healthy" network improves location accuracy.

The invention determines the network health diagnoses using normal over-the-air signals in real-time as the signal is received and network operating parameters are collected. Alternatively, the operating parameters can be stored for later analysis and diagnosis. Any over-the-air signal transmitted during normal operation of the radio is sufficient to diagnose network health. No special test period or test signal is required. Since the "health" of the network is determined during over-the-air operation, prior art bench tests are not required. The present invention does not require removing the radio from active service to evaluate network "health."

The diagnostic system of the invention extracts the necessary operating parameters (from which the network health can be determined) for any signal protocol, waveform and format and also for an encrypted and unencrypted signal. However, the diagnostic system must know, in advance, the signal protocol and format to determine whether the transmitted radio signal complies with that signal protocol and format.

The "health" of the network is related to the "health" of each radio within the network. When network communications involve a base station, the network "health" is also influenced by the mechanical, physical and electronic properties of the base station (e.g., a bad cable, connector or antenna). Further, the network "health" is influenced by propagation paths from the radio to the base station with which it communicates. Network "health" is important to ensure that a radio user can effectively communicate with others in the network.

When used in the present application, the network "health" refers to performance in accordance with applicable performance specifications as determined by the radio manufacturer, system architecture or as determined by the user or network operator. That is, the network operator may require tighter tolerances for certain operational parameters due to the characteristics of its network. An analysis of the health of the network is, to a degree, dependent on the health of the radios that comprise the network.

One application of the present invention applies to radios operating in a trunked radio system that includes a location-determining subsystem for determining the location of any transmitting radio. In this application the network health is important to accurately locate the radio and thus its operator.

A network may comprise a plurality of base stations and a plurality of mobile radios that each send signals to and receive signals from the base station. Upon reaching the base station, the signals are typically relayed to another mobile radio in the network. As the radios move around the network each radio is in contact with a different base station for communicating with other radios in the network.

In one example of the present invention, signal receivers (also referred to as sensors) are disposed proximate to each network base station. Each receiver receives and analyzes a signal transmitted from a radio within the coverage area of the base station with which the receiver is associated (albeit the radio is likely moving around the network coverage area). The network health can then be determined from these signal parameters.

A location of the sending radio, although not required to determine network health, can be approximately known or can be approximately determined, for example, by using a triangulation technique or by reference to one or more signal parameters (especially a power-related parameter) and the variation of those parameters as they are measured at each receiver, i.e., at each base station. The measured signal parameters from a signal transmitted by a given radio can be compared with the signal parameters from signals transmitted from other radios to determine an approximate location of the given radio or that the radio is closer to one base station than it is to another base station. For example, if the signal strength is higher at base station A than at base station B for a given signal, then it can be deduced that the transmitting radio is closer to base station A than base station B. But if the SNR is poor at base station A but marginal at base station B, then there may be noise or interference along the signal path from the radio to base station A. From such signal parameters and by comparing and contrasting signal parameters, a map of the received signal parameters in the base station coverage area can be created. The map indicates the signal parameters for the same signal as it is received at each network base station.

See FIG. 1. For example, assume a radio is transmitting from a location 1 of a network comprising base stations 3,

4 and 5. The signal is received at base stations 3, 4 and 5 and the desired signal parameters are determined at the base stations 3, 4, and 5. Similarly, a signal transmitted from a radio at a location 6 is also received at the base stations 3, 4 and 5 and the parameters of the received signal measured at each base station 3, 4 and 5.

Figure 2:
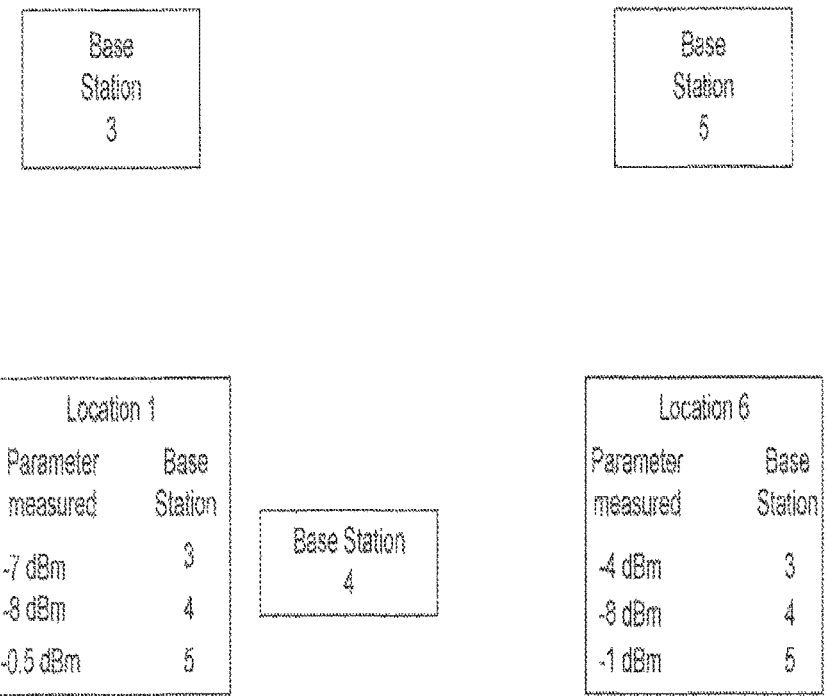
FIG. 2 illustrates a network map based on the signal parameters determined with respect to FIG. 1.

FIG. 2 is a map of the information described with respect to FIG. 1. At map location 1, the received signal parameters as determined at each base station 3, 4, and 5 (or the receiver associated with each base station 3, 4 and 5) are indicated. At the map location 6, the signal parameters as the signal is received at the base stations 3, 4 and 5 (or at the receiver associated with each of the base stations 3, 4 and 5) are indicated. Thus the map of FIG. 2 provides an indication of the network performance (i.e., as the signal is received at the base stations 3, 4 and 5) for locations 1 and 6 in the network coverage area. However, as described above, it is not necessary to know the location of the transmitting radio as the map can be created without this information.

By locating a receiver at each network base station and using multiple radio transmissions from different locations in the network coverage area, a signal parameter map can be determined for the network. The map may indicate, for example, that for a radio transmitting from location 1, the signal parameter as measured at base station 5 is inexplicably low. But the same signal parameter as measured at the other base stations 3 and 4 is within the expected parameter range. Since the other base stations measure an acceptable operating parameter, the data suggests a problem at base station 5 or on the path from location 1 to base station 5. An operational problem with the transmitting radio is ruled out as base stations 3 and 4 measure acceptable parameter values.

The network performance should be determined by receiving and measuring signals from known-good radios. A radio exhibiting poor health cannot be used to determine the network health, as it is difficult to differentiate between a poor heath radio and a poor health network. Techniques for determining whether a radio is characterized as a "good health" radio are set forth in co-pending and co-owned applications: (1) the application filed on Sep. 14, 2010, assigned application Ser. No. 12/882,193 and entitled Method and System for Analyzing Radio Performance During Over-the-Air Operation and (2) the application filed on May 12, 2011 and assigned application Ser. No. 13/106,812 and entitled Method and System for Diagnosing Radio Performance During Functional Over-the-Air Operation.

To determine the network health, it is necessary for each receiver to analyze the same signal. This is accomplished by time aligning the signals received at the different receivers where all the received signals represent the same emission from the same transmitting radio. There are several schemes that can be used to time align the signals as received at each receiver. For example, a one pulse per second timing signal may be available within the network and can be used to check the time alignment of the received signals. A time alignment technique is required to ensure that the SNR, for example, of the same signal is measured at each receiver and thereafter displayed on the network map.

The network diagnostic system of the present invention, in addition to the network receivers, comprises at least one master controller receiving signal information over a backhaul link from all receivers in the network. See FIG. 1, illustrating sensors 3', 4' and 5' collocated with respective base stations 3, 4 and 5, a master controller 7 (also referred to as a DiagnostX analyzer), and a backhaul link 8 between the master controller 7 and each sensor 3', 4' and 5'.

Each receiver receives the signal and sends signal-related information to the master controller 7. The master controller analyzes the signal information to determine signal parameters for the signal received at each receiver. By receiving and analyzing the signal parameters from all network receivers, the master controller can create a network map from which the network health, and in particular the network health at many different locations within the network, can be determined.

Alternatively, each sensor 3', 4', and 5' not only receives the signal but also performs the necessary analysis to determine the signal parameters from which the network health can be determined and displayed as described above. In this embodiment the determined signal parameters are sent to the master controller 7 over the backhaul link 8 for creating the network map depicted in FIG. 2.

The radio network may be degraded by many different circumstances. For example, an impediment along the RF receive path to a network base station/collocated receiver (e.g., an interfering structure reflecting RF signals away from a base station antenna or a proximate transmitter having a frequency spectrum that overlaps with the frequency spectrum of a radio transmission) may degrade network performance. Or a faulty component within the receiving base station (e.g., a degraded cable from the receiving antenna to the base station receiver front end) may degrade network performance and/or cause network parameters to vary from the specification values. A significant degradation or a significant variation from the specification may prevent a single radio or multiple radios within the network from communicating with the affected base station and thus from communicating with other radios within the network.

The network diagnostic system of the present invention may incorporate packet sniffing technology to determine that a radio is compliant with the applicable packet/signal specification and interoperability between systems operated by different network providers, e.g., as used by different government agencies, government departments or private users. For each transmission captured by the diagnostic systems, a representation of the protocol is presented, providing the user with information to determine whether each radio complies with its applicable protocol specification.

The ability of the diagnostic systems to determine whether a radio transmission embodies the correct packet structure also assists in identifying radios that may be the cause of network interoperability issues that degrade the health of one or both of the interoperating networks. The determination that a transmitted packet structure is correct ensures that any perceived network issues can be tracked to network problems and not to individual radio problems.

The network health diagnostic system may incorporate one or more different location methods to determine the location of a radio for use in determining network health. Knowing the location aids in determining the validity of data from multiple sensors as well as providing geographic association between the collected radio data and its location. Geographic location and radio health measurements assist the network provider and maintenance personnel in support of an optimally performing network and radios, while minimizing troubleshooting, guesswork and maintenance downtime.

Location methods that may be used in determining geographic location may include but are not be limited to;

Global Positioning System (GPS)

Assisted GPS (AGPS)

Cellular ID (CID)

Enhanced-cellular ID (E CID)
Timing Advance (TA)
Timing advance with network measurement reporting (TANMR)
Site ID (SID)
Enhanced observed time difference (E-OTD)
Time of arrival (TOA)
Time difference of arrival (TDOA)
Angle of arrival (AOA)
RF pattern matching (location fingerprinting)
Differential RSSI
Known static location For example, the location can be determined by performing a time of arrival measurement at each receiver then calculating the location at the master controller 7 of FIG. 1. Alternatively, each radio may contain its location (as determined by a GPS technique) in each transmission or the location information may transmitted on an alternative channel. The location information may be stored in a database.

Utilizing functional over-the-air performance measurements of only the "good" radios (which requires analysis of radio performance and the determination of "good" radios prior to analysis of network performance) and associating radio locations with uplink signal parameter measurements as received by one or more receivers allows the determination of network health from the perspective of the network base stations. The captured information can be used to create a visual display (e.g., the network map) and/or a tabular report of network and radio performance. Types of reports may include but are not limited to;
    RSSI maps and reports
    SNR maps and reports
    Measurement static heat maps and reports (a heat map does not have individual data points but instead uses a smeared area blob to indicate data. Specific colors can be used to identify ranges for the displayed parameter.)
    Propagation versus RSSI maps and reports
    Radio metric maps and reports
Maps depicting other operational parameters may also be created as known by those skilled in the art.

The health of a specific base station can also be determined from signal parameter information as collected at the network sensors. For example, assume that four receivers A, B, C, and D measure the following parameters for a single signal transmitted from a known location closest to receiver D.
    Receiver A detects the signal at −85 dB RSSI
    Receiver B detects the signal at −80 dB RSSI
    Receiver C detects the signal at −90 dB RSSI
    Receiver D detects the signal at −115 dB RSSI
The location of the radio is closest to receiver D but receiver D has the lowest signal strength. Most likely there is a problem at the site of receiver D since the other three receivers see the signal at about the same strength. Using a plurality of receivers and the data from each receiver helps to determine the health of the system from logical deduction of the captured metrics.

The network receivers used for network analysis can be added to an existing network as time and funds permit. Thus the network diagnostic system can be made more robust, accurate and complete by adding receivers for receiving and analyzing uplink signals from the radios. Recall that at each location on the network map the signal parameter information is reported based on the signal as received at each base station that has an associated receiver. As additional receivers are added the signal parameter information reported at each location becomes more complete. When all base stations have an associated receiver, the diagnostic network is complete and the signal information as received at each base station (i.e., at the receiver associated with each base station) can be reported for each location on the map.

The system can also store and display:
    A minimum RSSI threshold before signal parameter data is collected
    A median calculation on the collected data to statistically eliminate any outliers for a radio.
    Radio repair dates tied to a radio identifier (preferably a radio serial number or another unique radio identifier, such as the diagnostic identifier). A repair technician enters the radio identifier into the system before beginning the repair and a system-generated date is used as the repair date. When a repair date is entered the historical performance data and all radio transmissions are cleared.
    A suspect radio can be cleared of all recorded performance measurements and events to restart the collection and evaluation process for the radio. The system—generated date/time is used as the "clear" date.
    Store n previous performance data measurements for every radio.
    Maintain lists and pertinent data that indicate the health of each radio according to the parameters that the user or system operator defines for a suspect, failed and a properly operating radio. For example, the lists can indicate a radio always transmitting signals below a user-defined RSSI threshold, above a user-defined threshold but based on fewer than n measurements, and a subjective judgment as to the radio's health (e.g., good or suspect) and the metrics on which the judgment is based. The user or system operator can also define the contents of any list and data reporting requirements for any radio.
    Generate or use an operator-provided list of radio identification information that identifies radios for which performance data has not been collected.
    Install software updates or synthetic instrumentation via an Internet connection or manually from a CD or USB drive.

To identify incipient network problems, the network operator can set a relatively tight tolerance for network and radio operation; any performance parameters outside this range, while not indicative of a failure, may be evidence of a potential problem. Thus parameters outside the defined range may trigger an incipient problem alert.

Although the system of the present invention has been described with reference to separate receivers that are collocated proximate a network base station, such is not necessarily required. In another embodiment the receiving devices at the base station can perform the functions of the separate receivers. Further, the receivers can analyze received signals to determine the desired signal parameters or this function can be performed by a separate device. Although the invention has been shown and described with respect to a certain preferred embodiments, it is obvious that equivalent alterations and modifications will occur to others skilled in the art upon the reading and understanding this specification and the annexed drawing. In particular regard to the various functions performed by the above described components (assemblies, devices, circuits, etc.), the terms used to describe such components are intended to correspond, unless otherwise indicated, to any component that performs the specified function of the described component (i.e., that is functionally equivalent), even though not structurally equivalent to the disclosed structure that performs the function in the illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A communications network health-determining apparatus, the network comprising a plurality of network base station transceivers distributed over a geographic area and in bidirectional communication with mobile, portable, or stationary radios operating in the network, each radio having a respective radio identifier and transmitting a signal including the respective radio identifier, the apparatus comprising:
   health determining devices:
      configured to receive the signal during normal over-the-air operation of one of the radios; and
      configured to determine if the signal received by the one radio was transmitted from an authorized one of the radios; and
      when a health determining device determines that the signal is from an authorized radio:
         the health determining device determines the identifier within the received signal;
         the health determining device determines a signal waveform of the received signal at different times and compares the determined signal waveforms;
         the health determining device determines operating characteristics of the authorized radio from the compared signal waveforms; and
         the health determining device determines a current location of the authorized radio within the geographic area;
   a master controller communicatively coupled to the health determining devices;
   a first of the health determining devices:
      configured to analyze the operating characteristics of the authorized radio and determining if the authorized radio is healthy by at least one of:
         packet sniffing a received signal from the authorized radio and determining if the authorized radio is compliant with a packet/signal specification structure;
         discerning from the compliant packet/signal specification structure a type of transmission that has been received from the radio; and
         determining a frequency deviation of the received signal from the authorized radio and a range of frequency deviations of the signal from the authorized radio over time; and
      configured to send a first analysis result of the authorized radio to the master controller;
   a second of the health determining devices:
      configured to analyze the operating characteristics of the authorized radio and determining if the authorized radio is healthy by at least one of:
         packet sniffing a received signal from the authorized radio and determining if the authorized radio is compliant with a packet/signal specification structure;
         discerning from the compliant packet/signal specification structure a type of transmission that has been received from the radio; and
         determining a frequency deviation of the received signal from the authorized radio and a range of frequency deviations of the signal from the authorized radio over time; and
      configured to send a second analysis result of the authorized radio to the master controller; and
   after both the first and second analysis results sent to the master controller indicate that the authorized radio is healthy, the master controller determines from the first and second analysis results whether a geographically healthy or geographically unhealthy location of the network exists within the geographic area from which the authorized healthy radio transmitted the signal.

2. The apparatus according to claim 1, wherein the authorized radio in bidirectional communication with at least one of the first and second health determining devices receives the determination from at least one of the first and second health determining devices that the authorized radio is healthy.

3. The apparatus according to claim 1, wherein the authorized radio in bidirectional communication with at least one of the first and second health determining devices receives the determination from at least one of the first and second health determining devices that the authorized radio is not healthy.

4. The apparatus according to claim 3, wherein the authorized radio in bidirectional communication receives a bidirectional communication indicating the signal waveform determined to be unhealthy.

5. The apparatus according to claim 4, wherein the authorized radio in bidirectional communication receives the unhealthy signal waveform determination and a correction message to cure the unhealthy signal waveform.

6. The apparatus according to claim 3, wherein the authorized radio in bidirectional communication receives a bidirectional communication indicating at least one of:
   the authorized radio is not compliant with a packet/signal specification structure;
   the frequency of the signal from the authorized radio has deviated; and
   the range of frequency of the signal from the authorized radio over time has deviated.

7. The apparatus according to claim 6, wherein the authorized radio in bidirectional communication receives a correction message to cure the signal waveform determined to be unhealthy.

8. The apparatus according to claim 1, wherein the authorized radio in bidirectional communication with at least one of the health determining devices and the master controller receives the determination from at least one of the health determining devices and the master controller that the authorized radio is healthy.

9. The apparatus according to claim 1, wherein the authorized radio in bidirectional communication with at least one of the health determining devices and the master controller receives the determination from at least one of the health determining devices and the master controller that the authorized radio is not healthy.

10. The apparatus according to claim 9, wherein the authorized radio in bidirectional communication receives a bidirectional communication indicating at least one of:
   the authorized radio is not compliant with a packet/signal specification structure;
   the frequency of the signal from the authorized radio has deviated; and
   the range of frequency of the signal from the authorized radio over time has deviated.

11. The apparatus according to claim 10, wherein the authorized radio in bidirectional communication receives a correction message to cure the signal waveform determined to be unhealthy.

12. The apparatus according to claim 1, wherein, when the health determining device determines that the range of frequency deviations of the signal from the authorized radio over time is within a minimum range, the health determining device determines that the authorized radio is healthy.

13. The apparatus according to claim 1, wherein, when the health determining device determines that the range of frequency deviations of the signal from the authorized radio over time is outside a minimum range, the health determining device determines that the authorized radio is not healthy.

14. A communications network health-determining apparatus, the network comprising a plurality of network base station transceivers distributed over a geographic area and in bidirectional communication with mobile, portable, or stationary radios operating in the network, each radio having a respective radio identifier and transmitting a signal including the respective radio identifier, the apparatus comprising:
   health determining devices:
      configured to receive the signal during normal over-the-air operation of one of the radios; and
      configured to determine if the signal received by the one radio was transmitted from an authorized one of the radios; and
      when a health determining device determines that the signal is from an authorized radio:
         the health determining device determines the identifier within the received signal;
         the health determining device determines a signal waveform of the received signal at different times and compares the determined signal waveforms;
         the health determining device determines operating characteristics of the authorized radio from the compared signal waveforms; and
         the health determining device determines a current location of the authorized radio within the geographic area;
   a master controller communicatively coupled to the health determining devices;
   a first of the health determining devices:
      configured to analyze the operating characteristics of the authorized radio and determining if the authorized radio is healthy by at least one of:
         packet sniffing a received signal from the authorized radio and determining if the authorized radio is compliant with a packet/signal specification structure;
         discerning from the compliant packet/signal specification structure a type of transmission that has been received from the radio; and
         determining a frequency deviation of the received signal from the authorized radio and a range of frequency deviations of the signal from the authorized radio over time; and
      configured to send a first analysis result of the authorized radio to the master controller;
   a second of the health determining devices:
      configured to analyze the operating characteristics of the authorized radio and determining if the authorized radio is healthy by at least one of:
         packet sniffing a received signal from the authorized radio and determining if the authorized radio is compliant with a packet/signal specification structure;
         discerning from the compliant packet/signal specification structure a type of transmission that has been received from the radio; and
         determining a frequency deviation of the received signal from the authorized radio and a range of frequency deviations of the signal from the authorized radio over time; and
      configured to send a second analysis result of the authorized radio to the master controller; and
   after both the first and second analysis results sent to the master controller indicate that the authorized radio is healthy the master controller determines from the first and second analysis results whether a geographically healthy or geographically unhealthy location of the network exists within the geographic area from which the authorized healthy radio transmitted the signal or the authorized radio in bidirectional communication receives a bidirectional communication indicating the signal waveform determined to be unhealthy.

15. A communications network health-determining apparatus, the network comprising a plurality of network base station transceivers distributed over a geographic area and in bidirectional communication with mobile, portable, or stationary radios operating in the network, each radio having a respective radio identifier and transmitting a signal including the respective radio identifier, the apparatus comprising:
   health determining devices:
      configured to receive the signal during normal over-the-air operation of one of the radios; and
      configured to determine if the signal received by the one radio was transmitted from an authorized one of the radios; and
      when a health determining device determines that the signal is from an authorized radio:
         the health determining device determines the identifier within the received signal;
         the health determining device determines a signal waveform of the received signal at different times and compares the determined signal waveforms;
         the health determining device determines operating characteristics of the authorized radio from the compared signal waveforms; and
         the health determining device determines a current location of the authorized radio within the geographic area;
   a master controller communicatively coupled to the health determining devices;
   a first of the health determining devices:
      configured to analyze the operating characteristics of the authorized radio and determining if the authorized radio is healthy by at least one of:
         packet sniffing a received signal from the authorized radio and determining if the authorized radio is compliant with a packet/signal specification structure;
         discerning from the compliant packet/signal specification structure a type of transmission that has been received from the radio; and
         determining a frequency deviation of the received signal from the authorized radio and a range of frequency deviations of the signal from the authorized radio over time; and configured to send a first analysis result of the authorized radio to the master controller;
a second of the health determining devices:
  configured to analyze the operating characteristics of the authorized radio and determining if the authorized radio is healthy by at least one of:
    packet sniffing a received signal from the authorized radio and determining if the authorized radio is compliant with a packet/signal specification structure;
    discerning from the compliant packet/signal specification structure a type of transmission that has been received from the radio; and
    determining a frequency deviation of the received signal from the authorized radio and a range of frequency deviations of the signal from the authorized radio over time; and
  configured to send a second analysis result of the authorized radio to the master controller; and
after both the first and second analysis results sent to the master controller indicate that the authorized radio is healthy the master controller determines from the first and second analysis results whether a geographically healthy or geographically unhealthy location of the network exists within the geographic area from which the authorized healthy radio transmitted the signal or the authorized radio in bidirectional communication receives the unhealthy signal waveform determination and a correction message to cure the unhealthy signal waveform.

16. A communications network health-determining apparatus, the network comprising a plurality of network base station transceivers distributed over a geographic area and in bidirectional communication with mobile, portable, or stationary radios operating in the network, each radio having a respective radio identifier and transmitting a signal including the respective radio identifier, the apparatus comprising:
  a master controller;
  health determining devices:
    communicatively coupled to the master controller; and
    configured to receive the signal during normal over-the-air operation of one of the radios; and
  either:
    the health determining devices:
      configured to determine if the signal received by the one radio was transmitted from an authorized one of the radios; and
      when a health determining device determines that the signal is from an authorized radio:
        the health determining device determines the identifier within the received signal;
        the health determining device determines a signal waveform of the received signal at different times and compares the determined signal waveforms;
        the health determining device determines operating characteristics of the authorized radio from the compared signal waveforms; and
        the health determining device determines a current location of the authorized radio within the geographic area;
    a first of the health determining devices:
      configured to analyze the operating characteristics of the authorized radio and determining if the authorized radio is healthy by at least one of:
        packet sniffing a received signal from the authorized radio and determining if the authorized radio is compliant with a packet/signal specification structure;
        discerning from the compliant packet/signal specification structure a type of transmission that has been received from the radio; and
        determining a frequency deviation of the received signal from the authorized radio and a range of frequency deviations of the signal from the authorized radio over time; and
      configured to send a first analysis result of the authorized radio to the master controller; and
    a second of the health determining devices:
      configured to analyze the operating characteristics of the authorized radio and determining if the authorized radio is healthy by at least one of:
        packet sniffing a received signal from the authorized radio and determining if the authorized radio is compliant with a packet/signal specification structure;
        discerning from the compliant packet/signal specification structure a type of transmission that has been received from the radio; and
        determining a frequency deviation of the received signal from the authorized radio and a range of frequency deviations of the signal from the authorized radio over time; and
      configured to send a second analysis result of the authorized radio to the master controller; and
    after both the first and second analysis results sent to the master controller indicate that the authorized radio is healthy, the master controller determines from the first and second analysis results that a geographically unhealthy location of the network exists within the geographic area from which the authorized healthy radio transmitted the signal;
  or
    the health determining devices:
      configured to determine if the signal received by the one radio was transmitted from an authorized one of the radios; and
      when a health determining device determines that the signal is from an authorized radio:
        the health determining device determines a current location of the authorized radio within the geographic area; and
        the health determining device forwards the signal of the authorized radio along with the radio identifier and the current location of the authorized radio to the master controller; and
    the master controller:
      configured to receive the signal, the radio identifier, and the current location from the health determining devices;
      configured to determine a signal waveform of the received signal at different time and compares the determined signal waveforms;
      configured to determine operating characteristics of each of the authorized radios from the respective compared signal waveforms;
      configured to analyze the operating characteristics of each of the authorized radios and determining if each of the authorized radios is healthy by at least one of:

packet sniffing a received signal from the authorized radio and determining if the authorized radio is compliant with a packet/signal specification structure;

discerning from the compliant packet/signal specification structure a type of transmission that has been received from the radio; and determining a frequency deviation of the received signal from the authorized radio and a range of frequency deviations of the signal from the authorized radio over time; and configured to create an analysis result of each of the authorized radios;

after at least two analysis results sent to the master controller from two different health determining devices indicate that one of the authorized radios is healthy, the master controller determines whether a geographically healthy or geographically unhealthy location of the network exists within the geographic area from which the authorized healthy radio transmitted the signal.

17. The apparatus according to claim 16, wherein the authorized radio in bidirectional communication with at least one of the first and second health determining devices receives the determination from at least one of the health determining devices and the master controller that the authorized radio is healthy.

18. The apparatus according to claim 16, wherein the authorized radio in bidirectional communication with at least one of the first and second health determining devices receives the determination from at least one of the health determining devices and the master controller that the authorized radio is not healthy.

19. The apparatus according to claim 18, wherein the authorized radio in bidirectional communication receives a bidirectional communication indicating at least one of:

the authorized radio is not compliant with a packet/signal specification structure;

the frequency of the signal from the authorized radio has deviated; and the range of frequency of the signal from the authorized radio over time has deviated.

20. The apparatus according to claim 19, wherein the authorized radio in bidirectional communication receives a correction message to cure the signal waveform determined to be unhealthy.

21. The apparatus according to claim 16, wherein the authorized radio in bidirectional communication receives a bidirectional communication indicating the signal waveform determined to be unhealthy.

22. The apparatus according to claim 21, wherein the authorized radio in bidirectional communication receives the unhealthy signal waveform determination and a correction message to cure the unhealthy signal waveform.

23. The apparatus according to claim 16, wherein:

when the health determining device determines that the range of frequency deviations of the signal from the authorized radio over time is within a minimum range, the health determining device determines that the authorized radio is healthy; and when the master controller determines that the range of frequency deviations of the signal from the authorized radio over time is within a minimum range, the master controller determines that the authorized radio is healthy.

24. The apparatus according to claim 16, wherein:

when the health determining device determines that the range of frequency deviations of the signal from the authorized radio over time is outside a minimum range, the health determining device determines that the authorized radio is not healthy; and when the master controller determines that the range of frequency deviations of the signal from the authorized radio over time is outside a minimum range, the master controller determines that the authorized radio is not healthy.

* * * * *